United States Patent
Wood et al.

(10) Patent No.: US 10,487,726 B2
(45) Date of Patent: Nov. 26, 2019

(54) TURBOCHARGER ASSEMBLY

(71) Applicant: Garrett Transporation I Inc., Torrance, CA (US)

(72) Inventors: Daniel Wood, Torrance, CA (US); Rong Zhang, Shanghai (CN); Jian Feng, Shanghai (CN); Jian Shen, Shanghai (CN); Qiqi Tan, Shanghai (CN)

(73) Assignee: Garrett Transportation I Inc., Torrance, CA (US)

( * ) Notice: Subject to any disclaimer, the term of this patent is extended or adjusted under 35 U.S.C. 154(b) by 124 days.

(21) Appl. No.: 15/437,417

(22) Filed: Feb. 20, 2017

(65) Prior Publication Data

US 2018/0238227 A1 Aug. 23, 2018

(51) Int. Cl.
| | |
|---|---|
| *F02B 33/44* | (2006.01) |
| *F02B 39/00* | (2006.01) |
| *F01D 25/12* | (2006.01) |
| *F01D 25/14* | (2006.01) |
| *F02B 39/14* | (2006.01) |
| *F02B 37/18* | (2006.01) |
| *F01D 25/18* | (2006.01) |

(52) U.S. Cl.
CPC .......... *F02B 39/005* (2013.01); *F01D 25/125* (2013.01); *F01D 25/14* (2013.01); *F02B 37/183* (2013.01); *F02B 39/14* (2013.01); *F01D 25/18* (2013.01); *F05D 2220/40* (2013.01); *Y02T 10/144* (2013.01)

(58) Field of Classification Search
CPC ...... F02B 39/005; F02B 39/14; F01D 25/125; F01D 25/14; F01D 25/16

USPC ........................................................ 60/605.3
See application file for complete search history.

(56) References Cited

U.S. PATENT DOCUMENTS

| | | | | |
|---|---|---|---|---|
| RE24,317 E | * | 5/1957 | Schott ................... | F16H 61/421 60/448 |
| 3,043,636 A | * | 7/1962 | Macinnes ............. | F01D 25/166 384/287 |

(Continued)

FOREIGN PATENT DOCUMENTS

| | | | | |
|---|---|---|---|---|
| EP | 2407645 A1 | * | 1/2012 | ............. F01D 25/14 |
| EP | 2 886 808 A2 | | 6/2015 | |

(Continued)

OTHER PUBLICATIONS

EP Appl. No. 18157034.2-1006, EPO European Search Report / Examination Report, dated Jun. 25, 2018 (8 pages).

*Primary Examiner* — Ngoc T Nguyen
(74) *Attorney, Agent, or Firm* — Brian J. Pangrle

(57) ABSTRACT

A turbocharger can include a center housing; a compressor assembly operatively coupled to the center housing; and a turbine assembly operatively coupled to the center housing, where the center housing includes a bearing boss that includes a bore wall with opposing axial ends that define an axial through bore having opposing axial openings, an oil inlet, an oil outlet, an arcuate oil passage in fluid communication with the oil inlet, an oil passage in fluid communication with the arcuate oil passage and an opening in the bore wall, and an oil drainage passage in fluid communication with the opposing axial openings of the through bore and in fluid communication with the oil outlet.

19 Claims, 15 Drawing Sheets

(56) References Cited

U.S. PATENT DOCUMENTS

| | | | | |
|---|---|---|---|---|
| 4,235,484 A | * | 11/1980 | Owen | F01D 25/166 184/6.11 |
| 4,704,075 A | * | 11/1987 | Johnston | F01D 25/125 417/407 |
| 5,993,173 A | | 11/1999 | Kolke et al. | |
| 8,757,885 B2 | | 6/2014 | Hornbach et al. | |
| 2015/0056064 A1 | * | 2/2015 | Takama | F01D 25/125 415/110 |

FOREIGN PATENT DOCUMENTS

| | | |
|---|---|---|
| GB | 2 126 663 A | 3/1984 |
| JP | H01 178723 A | 7/1989 |
| JP | 2004-084591 A | 3/2004 |
| JP | 2014-206067 A | 10/2014 |
| WO | 2014 014791 A1 | 1/2014 |
| WO | 20150022774 A1 | 1/2015 |

\* cited by examiner

US 10,487,726 B2

TURBOCHARGER ASSEMBLY

TECHNICAL FIELD

Subject matter disclosed herein relates generally to turbocharger components for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. An electric compressor can include one or more compressor wheels that are connected to a shaft or shafts that can be driven by an electric motor. As an example, a shaft that is attached to one or more bladed wheels may be supported by one or more bearings disposed in a bearing housing, which may form a center housing rotating assembly (CHRA). During operation of a turbocharger or an electric compressor, depending on factors such as size of various components, a shaft may be expected to rotate at speeds in excess of 200,000 rpm. To ensure proper rotordynamic performance, a rotating group should be well balanced, well supported and well lubricated over a wide range of conditions (e.g., operational, temperature, pressure, etc.).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
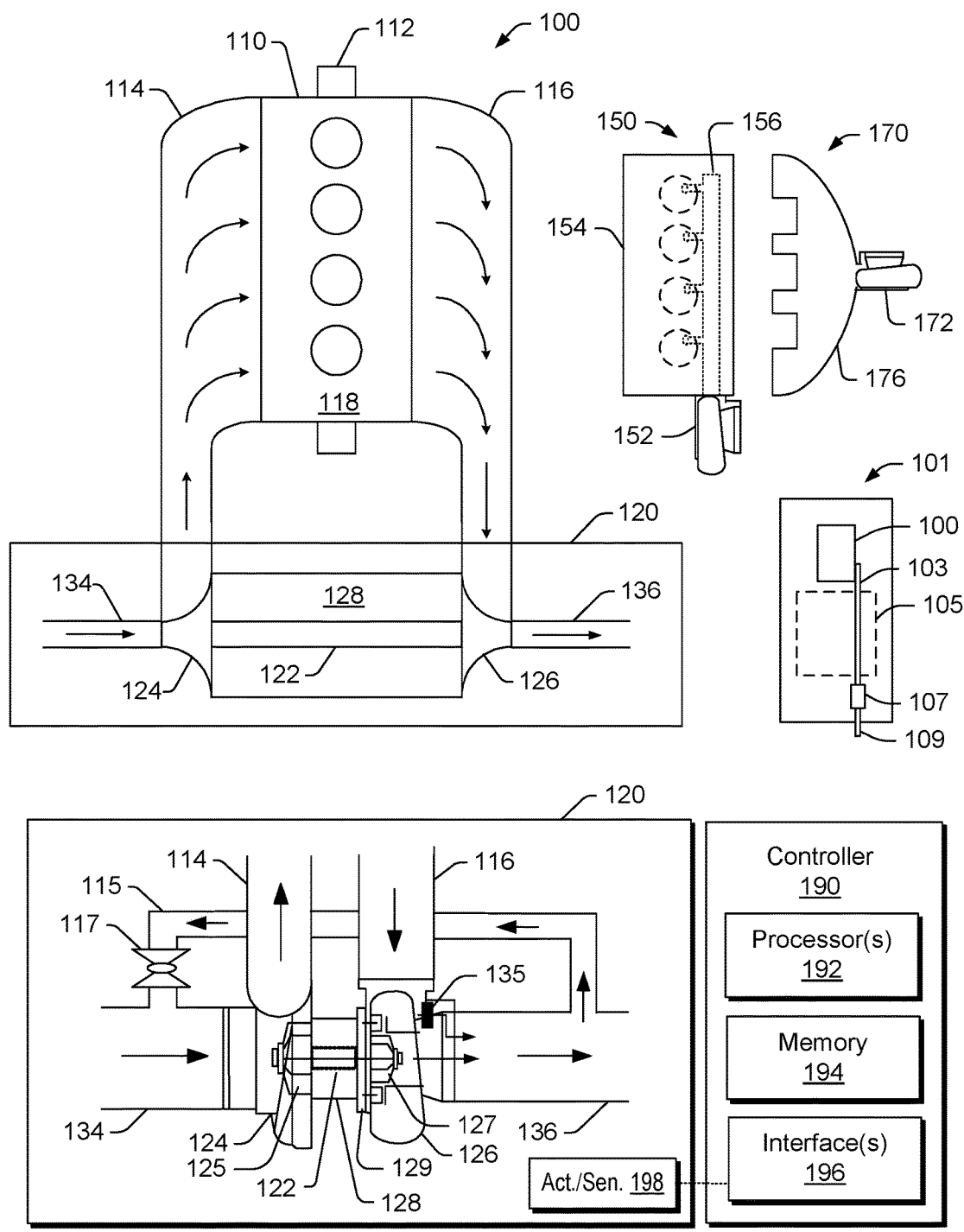
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
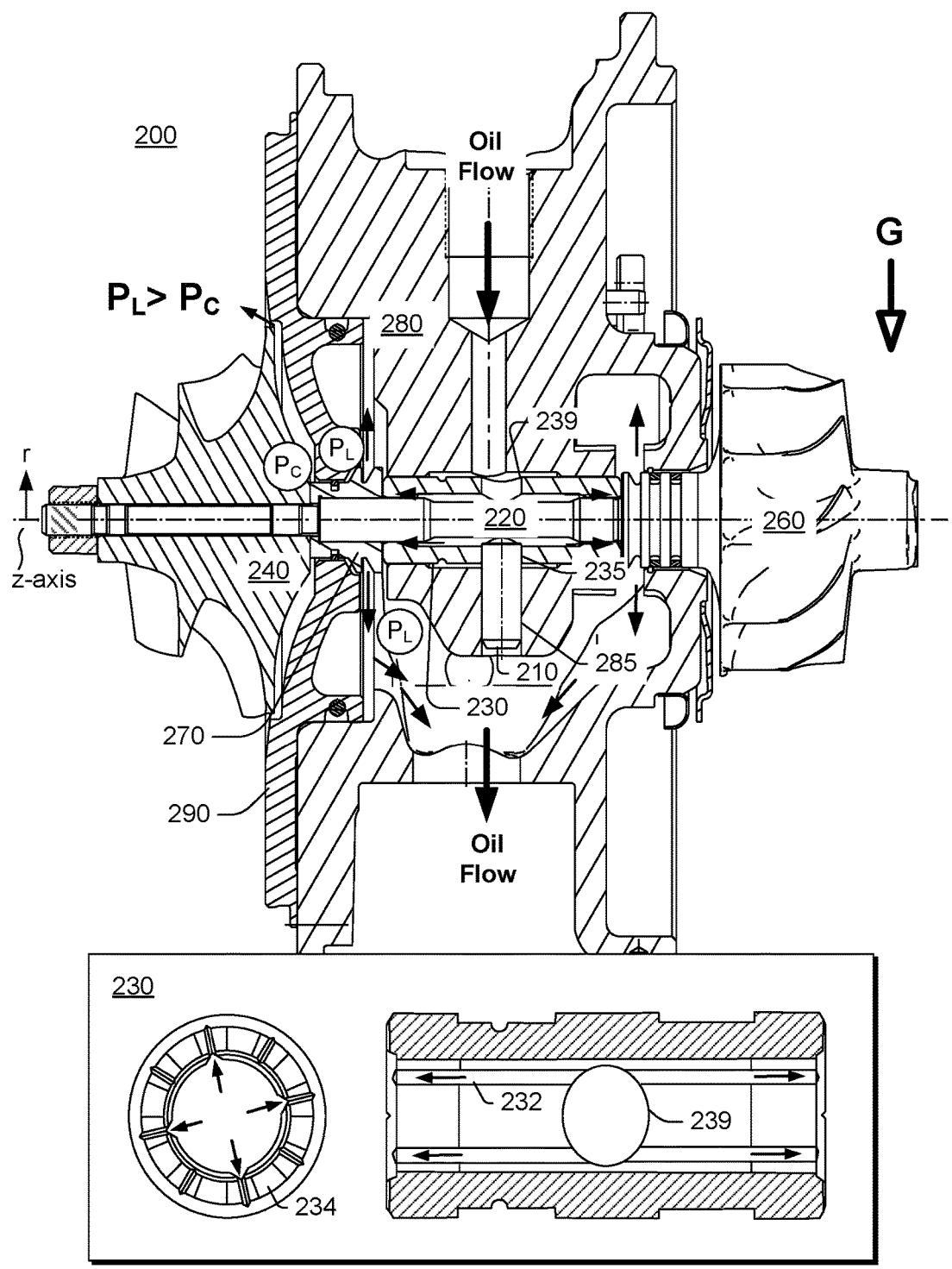
FIG. 2 is a cross-sectional view of an example of a turbocharger assembly and an end view and a cross-section view of an example of a journal bearing.

FIG. 2 shows an example of a turbocharger assembly 200 that includes a shaft 220 supported by a journal bearing 230 disposed in a center housing 280 between a compressor wheel 240 and a turbine wheel 260; noting that a thrust spacer 270 is shown as being positioned between the compressor wheel 240 and a shoulder of the shaft 220 with respect to a bore of a backplate 290. As shown in FIG. 2, the shoulder is formed by a step in diameter of the shaft 220 from a smaller diameter to a larger diameter, forming an annular axial face (e.g., a compressor side face). In the example of FIG. 2, the thrust spacer 270 abuts the axial face of the shaft 220 on one side and abuts an annular axial face of the compressor wheel 240 on an opposing side. The journal bearing 230 is located at least partially in a through bore of the center housing 280 via a locating pin 210. The locating pin 210 may be secured by being screwed into a socket 285 of the housing 280 and may be received by an aperture 235 of the journal bearing 230 to thereby locate the journal bearing 230 in the through bore of the center housing 280. As an example, the locating pin 210 may axially and azimuthally locate the journal bearing 230 in the through bore of the center housing 280. As shown in the example of FIG. 2, opposite the aperture 235, the journal bearing 230 includes a lubricant opening 239 for flow of lubricant to inner journal surfaces of the journal bearing 230 that support the shaft 220. Lubricant may flow to the through bore of the center housing 280, through the lubricant opening 239 and to the inner journal surfaces to form lubricant films that lubricate the shaft 220 within the journal bearing 230. Lubricant may also flow to clearances between walls of the bore of the center housing 280 and outer surfaces of the journal bearing 230.

As an example, the journal bearing 230 may move radially within the through bore of the center housing 280, for example, the journal bearing 230 may move up and down radially with respect to an axis of the locating pin 210 while being limited axially and azimuthally by the locating pin 210 (e.g., the journal bearing 230 may be a semi-floating journal bearing).

FIG. 2 also shows an end view and a cross-sectional view of the journal bearing 230. In the example of FIG. 2, the journal bearing 230 includes axially oriented channels 232 that extend across inner journal surfaces for flow of lubricant. The channels 232 extend to the end of the journal bearing 230 where various features provide for distribution of lubricant across thrust pads (e.g., thrust surfaces) 234 of the journal bearing 230. The thrust pads 234 of the journal bearing 230 and lubricant may help to manage thrust forces experienced during operation.

In the example of FIG. 2, the thrust surfaces forming the thrust pads 234 include radial grooves to improve thrust capacity while also enhancing contamination control. As an example, eight radial grooves at 45° spacing can be employed with four of the grooves in alignment with the axial grooves in the bearing bore. As an example, each of the axial grooves 232 may have a V-shape (e.g., a 90° V-shape). As shown, a relief on the inner periphery of each thrust surface may act to enhance lubricant delivery and distribution.

The thrust collar 270 can include an integral slinger or a separate slinger component may be provided. A slinger acts to direct lubricant outwardly away from the shaft, as indicated by arrows. A slinger can include one or more passages that extend from an inner radius to an outer radius to direct lubricant outwardly as the slinger rotates.

In the example of FIG. 2, the thrust collar 270 is shown as including an integral slinger and an annular face that faces the end of the journal bearing 230. As an example, lubricant may, under pressure of a lubricant feed system (e.g., an engine lubricant pump), be supplied to the thrust pads 234 of the journal bearing 230 to form a lubricant film between the annular face of the thrust collar 270 and the thrust pads 234 of the journal bearing 230. As the thrust collar 270 can rotate, lubricant that forms the lubricant film may be slung radially outwardly as well (e.g., additionally to lubricant in the passages of the slinger). Whether lubricant is slung from passages of the slinger or from the lubricant film, the lubricant may drain under the influence of gravity (see arrow labeled "G") downwardly towards a lubricant drainage cavity of the center housing 280.

FIG. 2 also shows small arrows near the compressor wheel 240 to indicate where lubricant may escape and possibly be carried with gas compressed by rotation of the compressor wheel 240 (e.g., in a compressor housing). A slinger may help to reduce escape of lubricant via a compressor. As shown in the example of FIG. 2, the backplate 290 has a contour such that slung lubricant can collect and flow along a larger radius located a distance away from the shaft 220. A slope at the bottom side of the contour of the backplate 290 may direct flow of lubricant to the lubricant drainage cavity of the center housing 280 (see, e.g., arrows).

As to pressures, the region formed between the backplate 290 and the center housing 280 can have a pressure that is approximately the same as that of the lubricant drainage cavity of the center housing (see, e.g., $P_L$). Thus, in such a scenario, the flow of lubricant to the lubricant drain of the center housing 280 occurs mainly under the influence of gravity. Such an approach may be considered an expansion approach, which acts to minimize the pressure of the lubricant exiting a clearance between the shaft 220 and the journal bearing 230 and, hence, minimize the driving force (e.g., pressure differential) for escape of lubricant to a space between the backplate 290 and the compressor wheel 240 (see, e.g., $P_C$). As indicated in the example of FIG. 2, by having an enlarged region (e.g., large volume) between the backplate 290 and the center housing 280, a large pressure drop may be achieved for lubricant exiting a clearance between the shaft 220 and the journal bearing 230 (e.g., considering that the lubricant is fed to the center housing 280 via a pump such as an engine oil pump). In the example of FIG. 2, small arrows indicate a flow direction for lubricant escape to the space via an interface formed between the thrust collar 270 and the backplate 290, noting that one or more seal rings (e.g., O-rings) may be positioned about the thrust collar 270 to resist such flow.

The turbocharger assembly 200 of FIG. 2 is oil cooled as well as air cooled, for example, by being in an environment with ambient air or vehicle engine compartment air. A turbocharger may be cooled via one or more mechanisms. For example, a turbocharger may be cooled via air, water, oil or other fluid. As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system.

To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

To reduce risk of coking and/or other lubricant issues, a system may employ water cooling where "water" is engine coolant that is circulated to a turbocharger, which may include a cast center housing with water passages and/or a water cooling jacket with water passages that is fit to or otherwise operatively coupled to an oil cooled turbocharger core (e.g., an oil cooled center housing).

Figure 3:
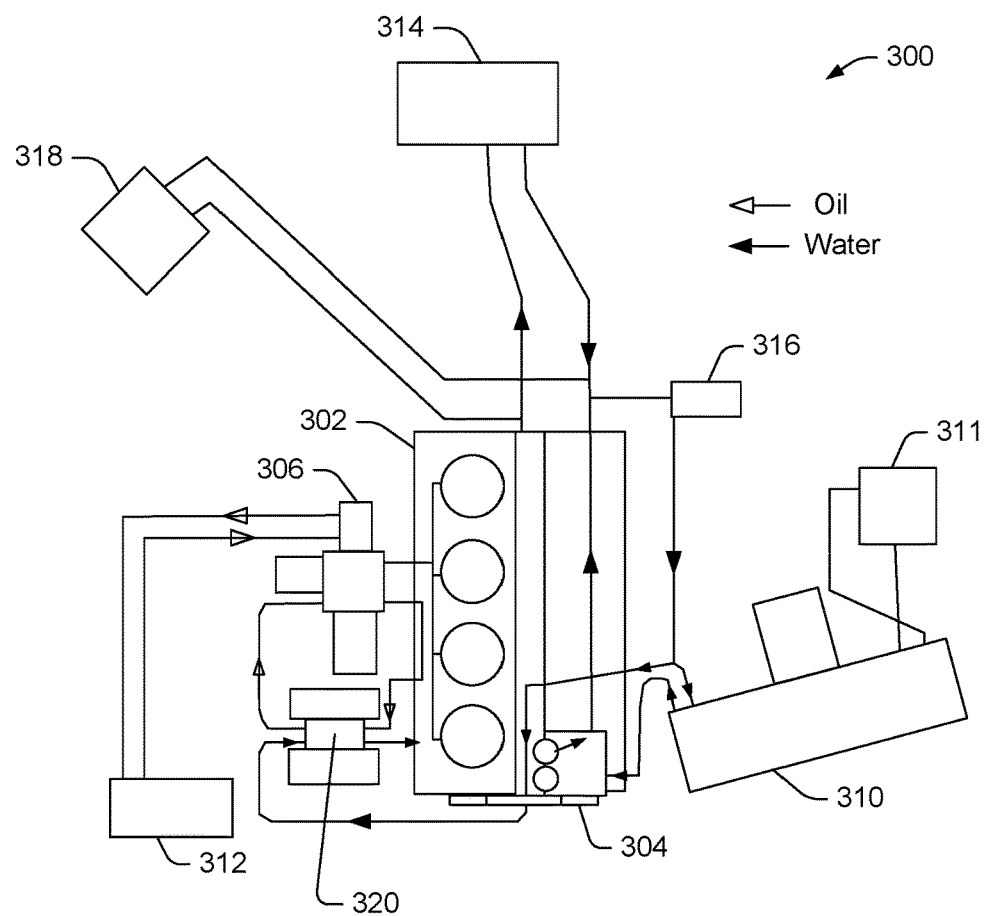
FIG. 3 is a diagram of an example of a system that includes an example of a water cooled turbocharger.
Figure 3:
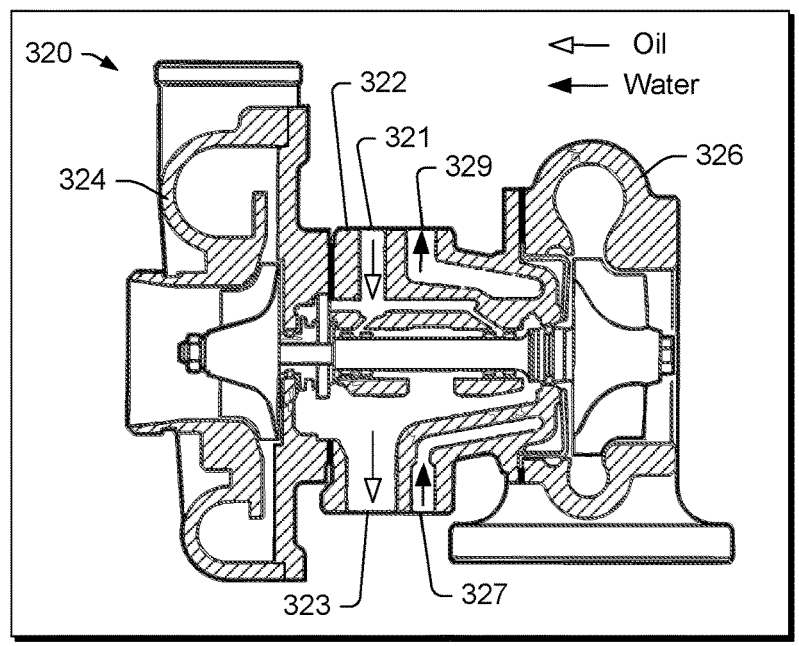

FIG. 3 shows an example of a system 300 that includes a turbocharger 320 that includes oil passages and water passages such that the system 300 includes separate water supply lines as well as oil supply lines. In FIG. 3, open headed arrows indicate general oil flow directions and solid headed arrows indicate general water flow directions; noting that "water" can be a coolant fluid that may include one or more chemicals other than water. The system 300 includes an internal combustion engine 302 with a mechanical water pump 304 and an oil pump and filtration assembly 306. A water radiator 310 includes a water tank 311, another heat exchanger 314 also provides for exchanging heat with water via water lines that are operatively coupled to an electric water pump 316 (e.g., a secondary water pump). The system 300 may include an automatic transmission fluid cooler 318 that can handle automatic transmission fluid of an automatic transmission operatively coupled to the internal combustion engine 302.

The internal combustion engine 302 can be cooled by circulating water as an engine coolant through an engine block, where it is heated by internal combustion, friction, etc. The water can then be circulated to the radiator 310 where it loses heat to the atmosphere, and then returned to the internal combustion engine 302. The mechanical water pump 304 may be mechanically driven during operation of the internal combustion engine 302 to force the water to circulate. As an example, the radiator 310 may be in an air flow path of a fan or fans, which may be mechanically and/or electrically driven.

FIG. 3 shows a cross-sectional view of the turbocharger 320, which includes a cast center housing 322, a compressor assembly 324 with a compressor housing and a compressor wheel operatively coupled to the cast center housing 322, a turbine assembly 326 with a turbine housing and a turbine wheel operatively coupled to the cast center housing 322, oil passages in the cast center housing 322 accessible via an oil inlet 321 and an oil outlet 323 (e.g., an oil drain) and water passages in the cast center housing 322 accessible via a water inlet 327 and an water outlet 329 (e.g., a water drain).

In the system 300 of FIG. 3, when the internal combustion engine 302 is running, water flows from the engine block, enters the lower end of the turbocharger 320, then comes out the top and is routed through a pipe behind a timing belt cover, which then connects to a coolant flange on a cylinder head. The water can flow through a top radiator hose and back to the radiator 310 for cooling.

When the internal combustion engine 302 is shut off, and the water coolant temperature at the exit of the cylinder head is above about 110 degrees C., the secondary electric water pump 316 can be turned on, which can provide circulating water through the top coolant line down into the turbocharger 320 and then into the engine block (e.g., to help ensure bubbles from the boiling water (e.g., coolant) get purged). For example, the direction of water flow through the cast center housing 322 may be reversed such that the inlet 327 is an outlet and the outlet 329 is an inlet.

The circulating water can help to keep the center housing 322 temperature at a reasonable level, for example, to help reduce coking of oil in the center housing 322. The electric water pump 316 may be controlled by an after-run temperature sensor (e.g., as part of an after-run control unit). When the electric water pump 316 is turned on, a low speed radiator fan may be turned on by an after-run control unit.

Various components of the system 300 add to vehicle complexity and weight. Further, the electric water pump 316 and connecting hoses may be overlooked and may fail at an inopportune time.

Figure 4:
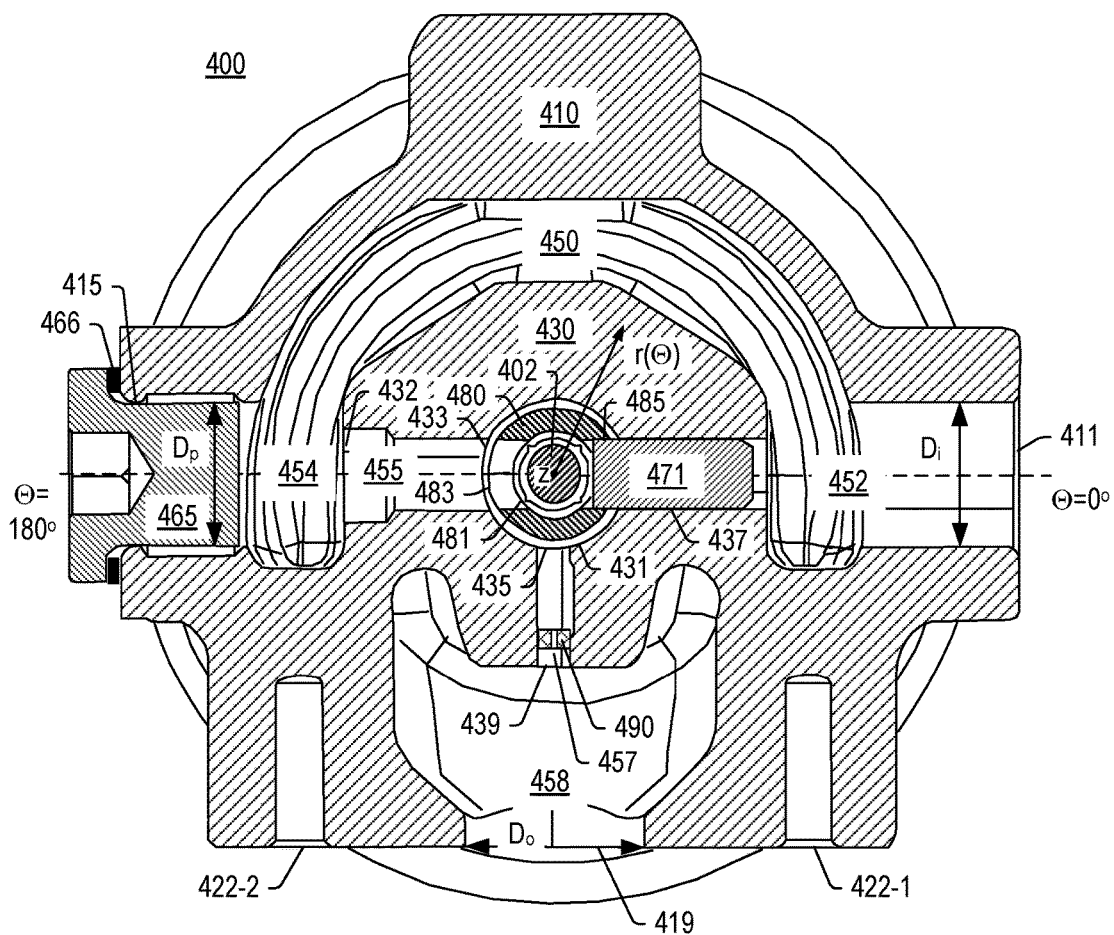
FIG. 4 is a cutaway view of an example of an oil cooled turbocharger assembly and views of an example of a bearing.
Figure 4:
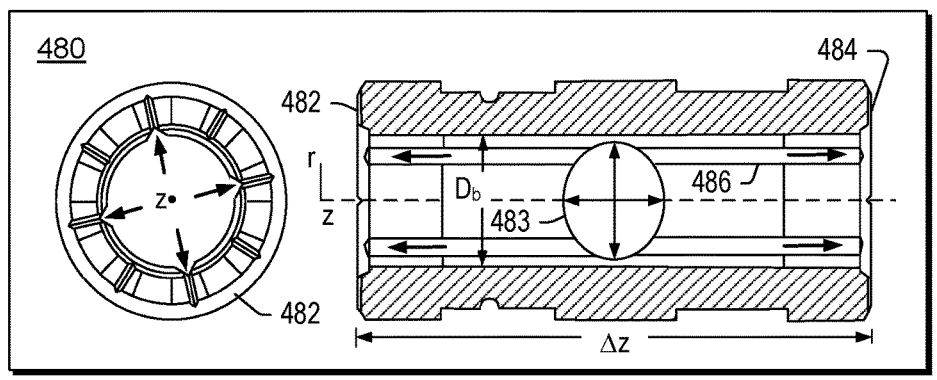

FIG. 4 shows a cross-sectional view of an example of a turbocharger assembly 400 that includes a center housing 410, which may be, for example, a cast center housing that is cast of a metallic material that includes at least one metal (e.g., to form a metal housing, an alloy housing or a composite metallic housing) and machined to provide various surfaces, features, etc.

As shown in FIG. 4, the center housing 410 includes an oil inlet 411 and an oil outlet 419. The center housing 410 also includes a bearing boss 430 that may be defined by a diameter about a longitudinal axis of the center housing 410, which may be an axis defined by a through bore of the center housing 410 that is formed at least in part by a bore surface 431.

As shown in FIG. 4, the bearing boss 430 can receive a bearing 480 that includes a through bore that receives a shaft 402 and that includes cross-bore portions 483 and 485 where the cross-bore portion 483 can receive oil and where the cross-bore portion 485 can receive a pin 471 as disposed at least in part in a pin bore 437 of the bearing boss 430 of the center housing 410. As an example, the sizes of the cross-bore portions 483 and 485 may be the same or may differ. As an example, the bearing 480 may be positioned in one of two orientations where the cross-bore portions 483 and 485 can receive the pin 471. The bearing 480 can include an axial length $\Delta z$ and an inner bore diameter $D_b$. The cross-bore portions 483 and 485 may be approximate of an even diameter and/or one or more of the cross-bore portions 483 and 485 may be oblong in one direction (e.g., a dimension along the z axis may be longer or shorter than a diameter in a direction orthogonal to the z axis).

As shown in FIG. 4, the center housing 410 includes oil passages which are in fluid communication with the oil inlet 411 and the oil outlet 419. The oil passages include an arcuate passage 450 that extends from a region 452 proximate to the oil inlet 411 to a region 454 that is proximate to a plug bore 415 of the center housing 410 that can receive a plug 465, which may be fit with one or more seal elements 465 such that oil does not pass outwardly from the region 454 through the plug bore 415. As an example, oil may flow in the arcuate oil passage in a particular direction (e.g., clockwise or counter-clockwise). In the view of FIG. 4, oil can flow in the arcuate oil passage 450 in a counter-clockwise direction; noting that a housing may include a different arrangement as to an inlet whereby oil may flow in a clockwise direction in such a view. For example, a cylindrical coordinate system is shown having a z-axis for a z coordinate, a radial axis for a r coordinate and an azimuthal coordinate that spans 360 degrees from 0 degrees at the oil inlet 411 and increasing in a counter-clockwise direction. Various dimensions are also shown in FIG. 4, including an inlet diameter $D_i$ of the oil inlet 411, which spans a distance (e.g., radial from z) to the region 452, a plug diameter $D_p$, which can be configured for receipt by the plug bore 415 and with a length that extends a distance toward the region 454 (e.g., optionally short of, even with a wall of the region 454 or into the region 454), and an outlet diameter $D_o$ of the oil outlet 419. As shown in the example of FIG. 4, the bore wall 431 has a diameter that exceeds the outer diameter of the bearing 480 and the passage 450 has a semi-diameter (e.g., inner wall radius) that exceeds the diameter of the bore wall 431. In the example of FIG. 4, the oil inlet 411 and the plug bore 415 extend radially inwardly to the passage 450.

Without the plug 465 and the pin 471, a straight line of sight can exists between the oil inlet 411 and the plug bore 415. As an example, a method of manufacture can include drilling one or more of the cross-bore portions 483 and 485 via the oil inlet 411 and/or the plug bore 415. As an example, a method of manufacture can include drilling a passage 457 via the oil outlet 419 where the passage 457 can extend to the bore wall 431.

As shown in the example of FIG. 4, the center housing 410 includes a passage 455 and the passage 457 in the bearing boss 430 where the passage 455 is in fluid communication with the region 454 via an opening 432 in the bearing boss 430 and further in fluid communication with the cross-bore portion 483 of the bearing 480 via an opening 433 in the bore wall 431 of the bearing boss 430 and where the passage 457 is in fluid communication with the through bore of the bearing boss 430 via an opening 435 in the bore wall 431 of the bearing boss 430 and further in fluid communication with a drainage region 458 via an opening 439 in the bearing boss 430 where the drainage region 458 can direct oil to the oil outlet 419. The oil drainage region 458 may be referred to as an oil drainage passage and/or as a cavity (e.g., an oil cavity or oil drainage cavity). As shown in the cross-sectional view of FIG. 4, the bearing boss 430 can include a through bore and the arcuate passage 450 and the drainage region 458, which may be at least in part defined by an arc, which may optionally be, for example, a of a lesser radius than an arc of the arcuate passage 450 (see, e.g., FIG. 8). As an example, the arcuate passage 450 can be separated from the drainage region 458 such that oil (e.g., as a lubricant and a heat transfer fluid) flow from the arcuate passage 450 via openings in the bearing boss 430 to the bore wall 431 and then from the region defined by at least in part by the bore wall 431 to the drainage region 458. As an example, a bearing received by the bearing boss 430 can rotatably support a shaft of a rotating group of a turbocharger (e.g., compressor wheel, shaft and turbine wheel) where oil flows to the bearing and shaft surfaces via the arcuate passage 450 and then from such surfaces to the drainage region 458. As an example, where one or more "short circuit" passages do not exist, oil flowing into the oil inlet 411 may pass exclusively through the bearing boss 430 to various bearing, bore wall and shaft surfaces and then to the drainage passage 458 (e.g., to the oil outlet 419). In such an example, the bearing system may present resistance to flow of oil and thereby, at least in part, control flow of oil through a center housing (e.g., based on pressure provided by a pump of oil to the oil inlet 411 where pressure at the oil outlet 419 is at a lower pressure to provide a pressure drop over a center housing). As an example, to control flow of oil, one or more short circuit passages (see, e.g., FIGS. 14A and 14B) may be utilized where such a passage or passages may be sized, fit with regulators, etc., to control how much oil (e.g., volume percent, flow rate fraction, etc.) flows to the bearing system and how much flows to the drainage region 458 in a manner that bypasses the bearing system (e.g., a portion of oil may flow via the bearing system and a portion of oil may bypass the bearing system where a bypass passage or bypass passages exist between an arcuate passage and a drainage region). As shown in the example of FIG. 4, oil entering the oil inlet 411 flows in the arcuate passage 450 over an arc span of approximately 180 degrees before being directed to the bearing system (e.g., the shaft 402, the bearing 480, and the bore wall 431).

As an example, the plug bore 415 may optionally be utilized as an oil inlet and/or an oil outlet. For example, where the plug bore 415 is utilized as an oil outlet, a portion of oil flowing in via the oil inlet 411 may exit the center housing 410 prior to flowing via the passage 455. In such an example, an oil flow rate to the passage 455 may be suitably adjusted or selected by using the plug 465 with one or more orifices therein. As an example, a pressure balance may be performed to determine resistance to flow via a bearing pathway or pathways and via one or more bypass pathways. In such an example, an inlet pressure may correspond to an oil pump deliverable pressure and an outlet pressure or pressures may correspond to pressure or pressures in one or more oil conduits fluidly coupled to one or more corresponding openings of a center housing.

In the example of FIG. 4, various features of the center housing 410 may be formed via casting or casting and machining. For example, the plug bore 415 may be cast and then machined to include threads, etc. As shown in the cross-sectional view of FIG. 4, the plug bore 415 of the center housing 410 can be in alignment with the passage 455 of the bearing boss 430 of the center housing 410. In such an example, the passage 455 may be machined via the plug bore 415, for example, via insertion of a tool in the plug bore 415 to contact the bearing boss 430. As another example, the pin bore 437 may be machined via insertion of a tool via the oil inlet 411 and the region 452. Once appropriately formed, the bearing 480 may be inserted into the through bore defined at least in part by the bore wall 431 of the bearing boss 430 and the pin 471 inserted via the oil inlet 411 and the region 452 to be seated at least in part in the pin bore 471 and at least in part in the cross-bore portion 485 of the bearing 480 to axially locate and azimuthally locate the bearing 480 in the through bore of the bearing boss 430. As an example, where the pin 471 is to be moved or removed, if the shaft 402 is not present, a tool may be inserted via the plug bore 415 and through the cross-bore portion 483 of the bearing 480 (e.g., where some cross-axial alignment of the cross-bore portions 483 and 485 exists) such that the pin 471 may be forced radially outwardly in the pin bore 437 and optionally removed via the oil inlet 411.

As an example, the passage 457 may be machined to desired specifications via insertion of a tool via the oil outlet 419 and the drainage region 458. As an example, the passage 457 may be machined to have a diameter and/or a shape that can regulate flow of oil. As an example, a component 490 with an orifice may be inserted into the passage 457. For example, consider a threaded component that may include outer threads that can be mated with inner threads of the passage 457. In such an example, the component may be selected and/or shaped to provide a desired amount of resistance to flow of oil from the through bore region to the drainage region 458. Such a component may be selected and/or shaped according to one or more operational conditions of a turbocharger and/or an internal combustion engine system. For example, consider one or more of oil pump operational conditions, turbocharger shaft speed operational conditions, temperature operational conditions, etc.

FIG. 4 shows an end view and a cutaway view of the bearing 480, noting that one or more other types of bearings may be utilized in the turbocharger assembly 400. As shown, the bearing 480 includes opposing ends 482 and 484, the cross-bore portion 483 and axial channels 486. In such an example, oil may flow from the cross-bore portion 483 as fed via the passage 455 of the bearing boss 430 and into spaces between an outer surface of the shaft 402 and inner surfaces of the through bore of the bearing 480, which can include surfaces of the axial channels 486.

In the example of FIG. 4, oil can flow from the passage 455 to the through bore defined by the bore wall 431 and to the passage 457 and/or to ends of the through bore of the bearing boss 430 that can correspond to the opposing ends 482 and 484 of the bearing 480 as disposed at least in part in the through bore of the bearing boss 430.

As shown and explained, the center housing 410 can include features that allow for machining and/or assembly. Further, the center housing 410 can include an oil flow regulation mechanism (see, e.g., the component 490 that may help to determine how much oil flows via ends of the through bore of the bearing boss 430 to the oil outlet 419 and how much oil may flow via the passage 457 to the oil outlet 419.

In the example of FIG. 4, the housing 410 includes bores 422-1 and 422-2, which may be threaded to receive bolts. In such an example, the housing 410 may be attached to another component, which can include, for example, a passage or conduit for receiving oil that flows through the oil outlet 419. As shown in FIG. 3, the turbocharger 320 includes the oil outlet 323 as indicated by an arrow and the water inlet 327 as indicated by an arrow. The housing 410 includes the oil outlet 419 and does not include a water inlet.

As an example, the oil outlet 419 and the bores 422-1 and 422-2 may be formed in a common boss, which may be a mounting boss. In such an example, the housing 410 may be mounted to a component, which may be, for example, an engine block or a component attached to an engine block. As an example, an engine block can include an oil inlet for receipt of oil from a housing such as the housing 410. In such an example, an oil pump associated with the engine block may be utilized to provide oil pressure to drive flow of oil to the oil inlet 411 of the housing 410.

Figure 5A:
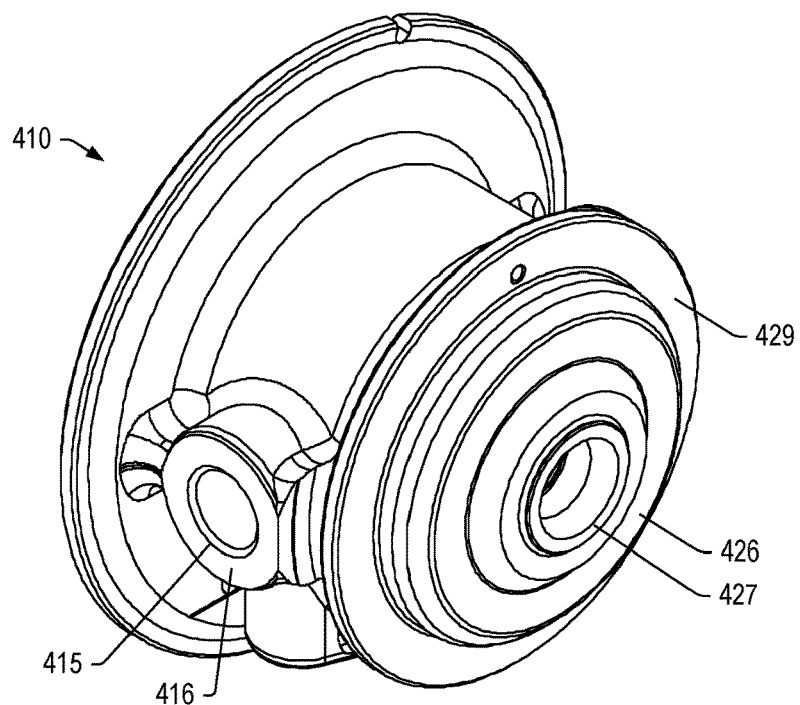
FIGS. 5A and 5B are perspective views of an example of a housing.
Figure 5B:
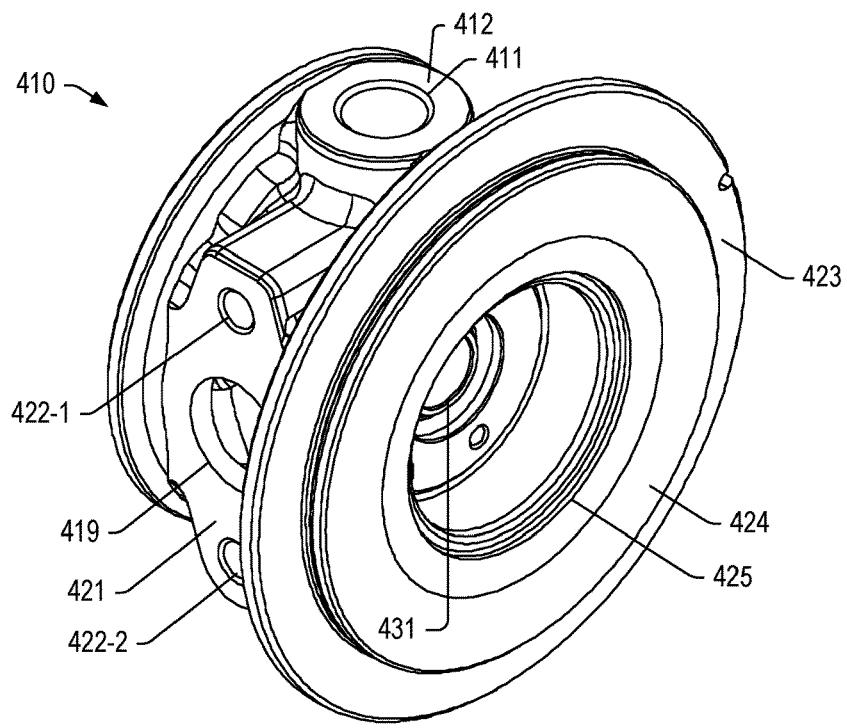

FIGS. 5A and 5B show perspective views of an example of the housing 410. As shown, the housing 410 includes turbine end features that include an annular surface 426, a bore wall 427 that defines a bore, and a flange surface 429 (e.g., for coupling to a turbine housing) and includes compressor end features that include a flange surface 423 (e.g., for coupling to a compressor housing), an annular surface 424, and a bore wall 425 that defines a bore. As shown, the bores defined by the bore walls 425 and 427 are co-axial with a bore defined by the bore wall 431. As such, the housing 410 includes a through bore that is formed by a plurality of bores that are co-axially aligned substantially along a rotational axis of a rotating group, which can include a compressor wheel, a turbine wheel and a shaft where the shaft and turbine wheel may be joined as a shaft and wheel assembly (SWA) and where the compressor wheel may be attached via a free end of the shaft where the compressor wheel may include a partial bore or a through bore. As to a partial bore, sometimes referred to as a boreless compressor wheel, it may include threads and a shaft can include matching threads to couple the boreless compressor wheel to the shaft. As to a through bore, a nut or other component may be utilized to secure the compressor wheel to the shaft where the shaft extends axially through the through bore of the compressor wheel.

Figure 6A:
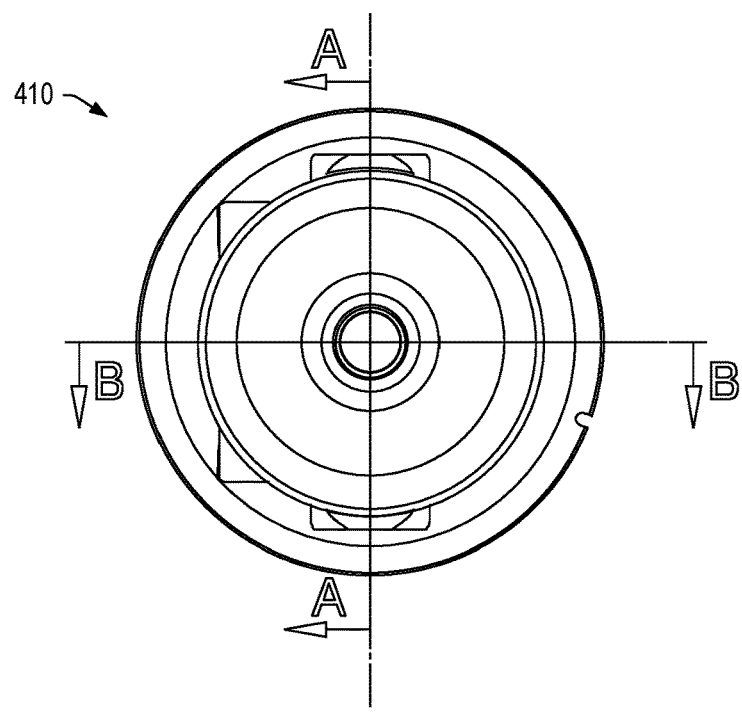
FIGS. 6A and 6B are an end view and a side view of the housing of FIGS. 5A and 5B.
Figure 6B:
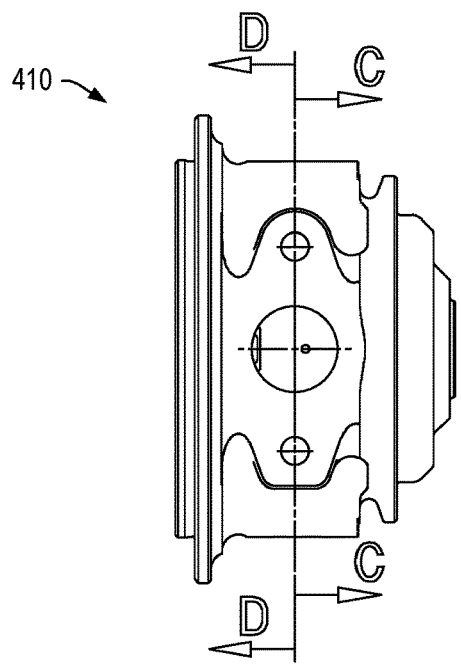
Figure 7A:
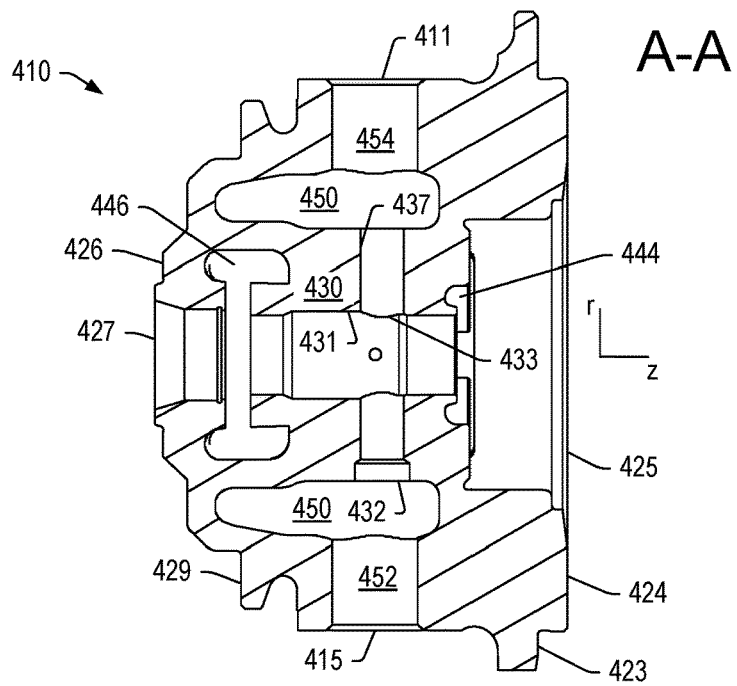
FIGS. 7A, 7B, 7C and 7D are cross-sectional views of the housing of FIGS. 6A and 6B.
Figure 7B:
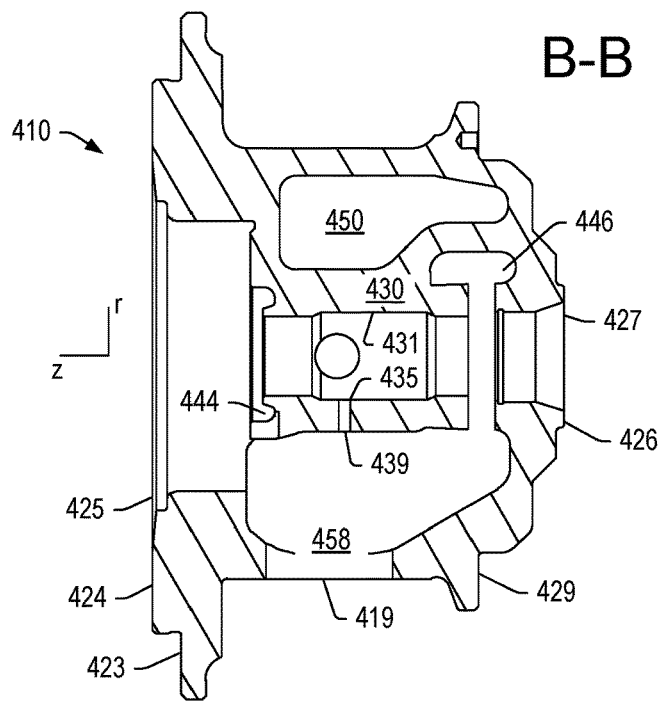

FIGS. 6A and 6B are an end view and a side view of the housing 410 of FIGS. 5A and 5B. Various cross-sectional views are indicated via arrows and letters. FIG. 7A shows a cross-sectional view along a line A-A, FIG. 7B shows a cross-sectional view along a line B-B, FIG. 7C shows a cross-sectional view along a line C-C, and FIG. 7D shows a cross-sectional view along a line D-D.

As shown in the example of FIG. 7A, the arcuate oil passage 450 has relatively symmetric cross-sectional areas. The areas are elongated with axial lengths and radial direction widths. As shown, the areas can be disposed substantially axially between the compressor side bore wall 425 and the turbine side bore wall 427 while being radially offset from a central axis of the bore defined by the bore wall 431. As shown, a compressor side recess 444 is disposed between the bore wall 431 and the bore wall 425 and a turbine side recess 446 is disposed between the bore wall 431 and the bore wall 427. The recesses 444 and 446 may receive oil, for example, oil that flow axially outwardly from each end of the bore wall 431. Oil that flows to the recesses 444 and 446 may then drain radially downwardly toward the oil drainage cavity 458 as shown in FIG. 7B, where it may exit via the oil outlet 419.

Figure 7C:
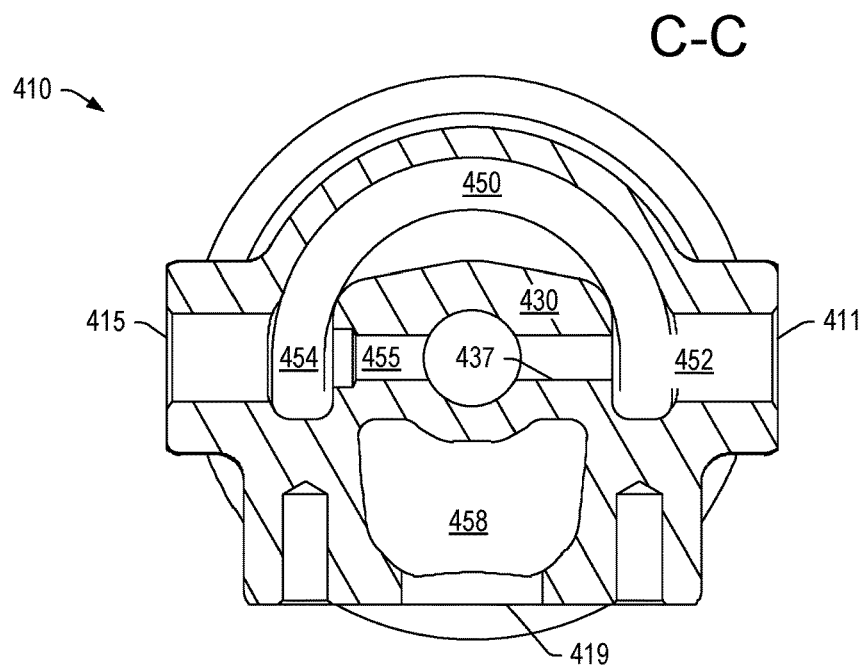
Figure 7D:
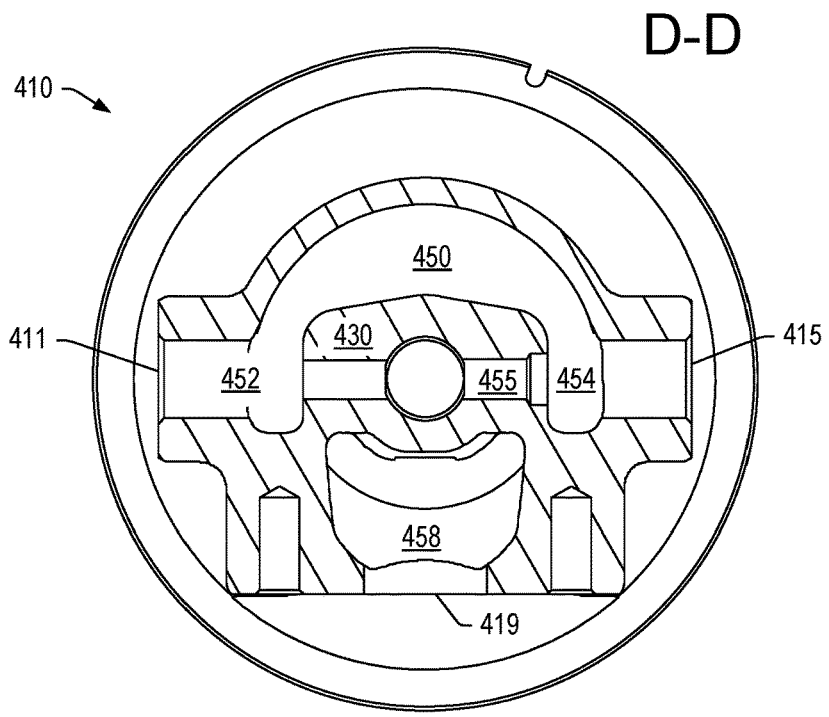

As mentioned, FIGS. 7C and 7D show cross-sectional views along the lines C-C and D-D. FIGS. 7C and 7D show an example of an arcuate shape of the arcuate oil passage 450.

Figure 8:
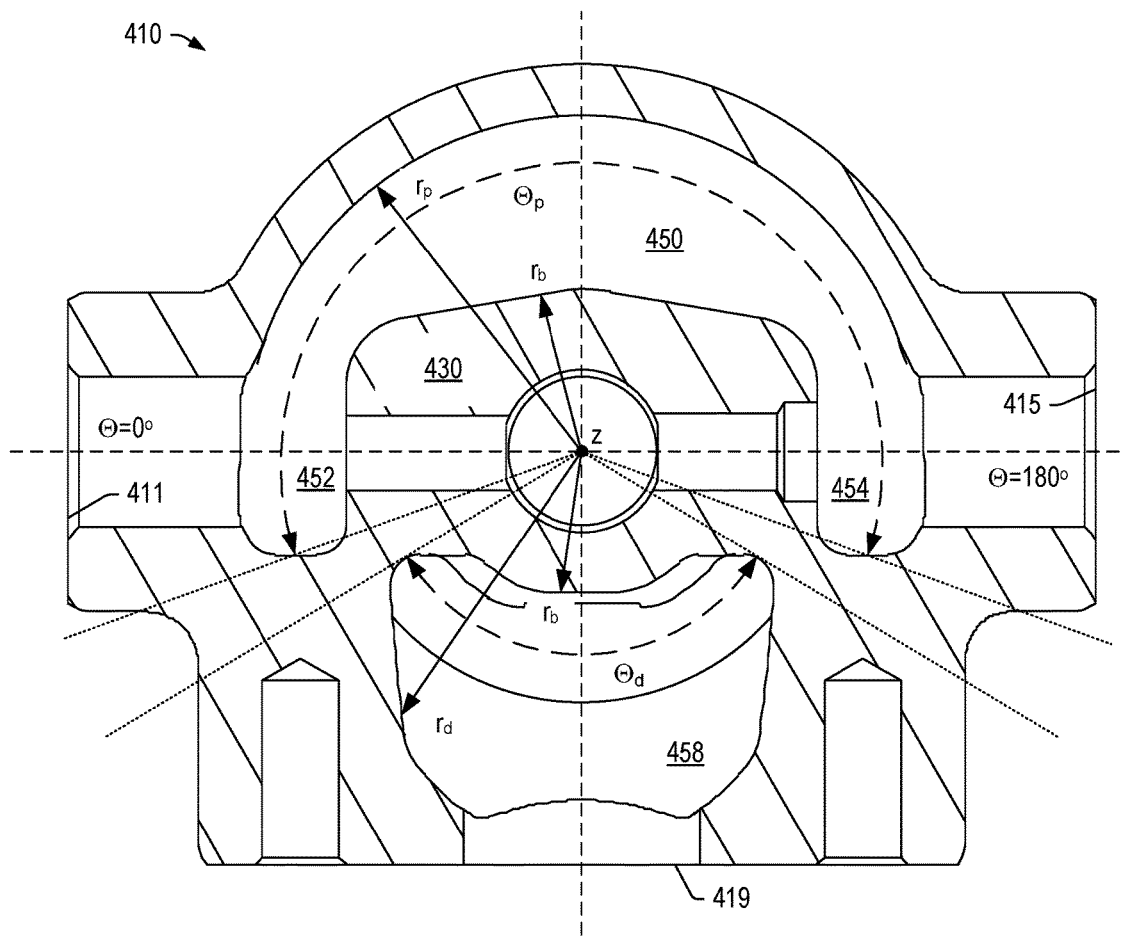
FIG. 8 is a cross-sectional view of the housing of FIGS. 6A and 6B with various dimensions illustrated.
Figure 8:
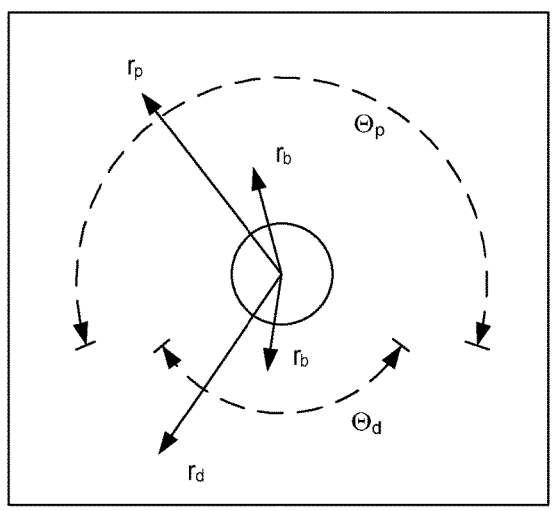

FIG. 8 is a cross-sectional view of the housing 410 with various dimensions illustrated. In particular, bearing bore radii $r_b$ are shown that define in part outer surfaces of the bearing boss 430, a passage radius $r_p$ is shown that defines in part an inner surface of the housing 410, and a drainage cavity radius $r_d$ is shown that defines in part an inner surface of the housing 410. FIG. 8 also shows arcs $\Theta_p$ and $\Theta_d$, which are a passage arc angle and a drainage cavity arc angle, respectively. As an example, a housing and features of a housing can be described with respect to coordinates of a cylindrical coordinate system or cylindrical coordinate systems where such coordinates include an axial coordinate (e.g., z), a radial coordinate (e.g., r) and an azimuthal coordinate (e.g., $\Theta$). As an example, an individual bore or opening may be described with respect to a cylindrical coordinate system, which may be referenced with respect to a cylindrical coordinate system where an axial coordinate is aligned along a central axis of a through bore of a housing that can receive a shaft supported by a bearing or bearings.

Figure 9:
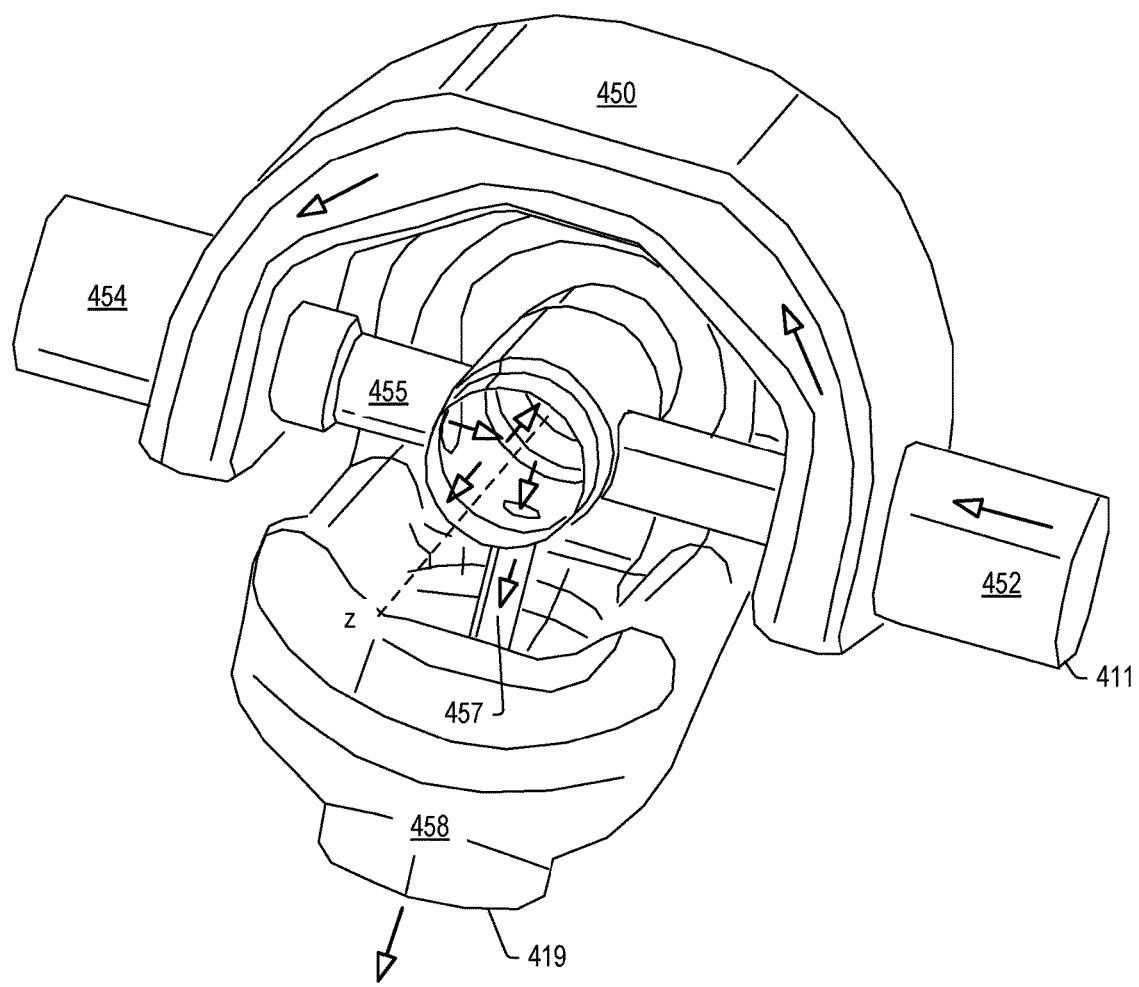
FIG. 9 is a perspective, positive view of spaces of the housing of FIGS. 6A and 6B.

FIG. 9 shows a positive rendition of various spaces of the center housing 410 of FIG. 4 along with arrows to indicate approximate directions of oil flow during operation of the center housing 410 as part of a turbocharger of an internal combustion engine system. In such an example, various components of the system 300 of FIG. 3 do not need to be included as the center housing 410 can be an oil only center housing (i.e., a center housing without water cooling passage(s)).

Figure 10:
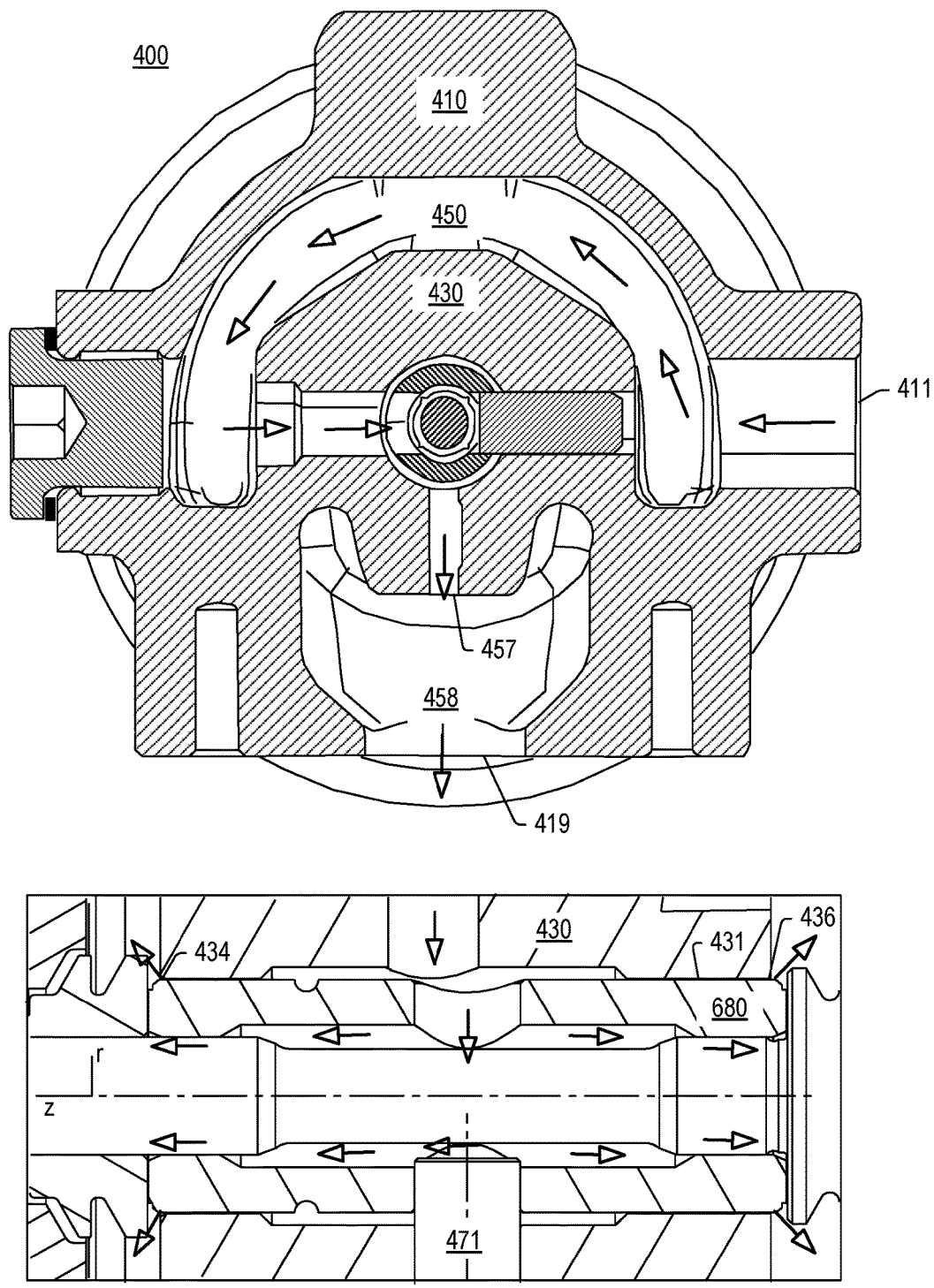
FIG. 10 is a cutaway view of the oil cooled turbocharger assembly of FIG. 4 and a cutaway view of a portion thereof with an example of a bearing with arrows to indicate approximate directions of oil flow.

FIG. 10 shows the cross-sectional view of FIG. 4 with arrows to indicate approximate directions of oil flow during operation of the center housing 410 as part of a turbocharger of an internal combustion engine system.

FIG. 10 also shows a cutaway view of an example of a bearing 680 disposed in the center housing 410 along with arrows that indicate approximate directions of oil flow toward axial ends of the bearing 680 and opposing axial ends 434 and 436 of the bore wall 431 that define the through bore of the bearing boss 430 of the center housing 410. As shown, the through bore has opposing axial openings.

As an example, a turbocharger can include the center housing 410; a compressor assembly operatively coupled to the center housing 410; and a turbine assembly operatively coupled to the center housing 410, where the center housing 410 includes the bearing boss 430 that includes the bore wall 431 with the opposing axial ends 434, 436 that define an axial through bore having opposing axial openings, the oil inlet 411, the oil outlet 419, the arcuate oil passage 450 in fluid communication with the oil inlet 411, the oil passage 455 in fluid communication with the arcuate oil passage 450 and the opening 433 in the bore wall 431, and the oil drainage passage 458 in fluid communication with the opposing axial openings of the through bore and in fluid communication with the oil outlet 419. In such an example, the oil drainage passage 458 can be a cavity that collects oil from various regions and that can direct the collected oil to the oil outlet 419, which may be a drain (e.g., an oil drain). Such an oil outlet may be in fluid communication with a conduit or a passage of another component where oil may flow, for example, for purposes of filtering and recirculating back to the center housing via the oil inlet 411. In such an example, the turbocharger may be an oil cooled turbocharger that does not require water coolant lines and/or water coolant passages as in the system 300 of FIG. 3.

Various features of the center housing 410 may be altered from those shown in FIGS. 4 to 10. As an example, a center housing can be defined in a cylindrical coordinate system and can include an axial through bore and can include three radial openings that are in fluid communication with internal oil passages. In such an example, one of the radial openings can be an oil inlet, one of the radial openings can be an oil outlet and the other one of the radial openings can be an access port that can be plugged. In such an example, the center housing can include an internal oil passage that is accessible via the oil outlet opening. In such an example, the internal oil passage may be an oil flow regulation passage, which may optionally receive a regulating component such as an annular component with one or more openings (e.g., orifices, etc.). As an example, an internal oil passage may be an oil flow bypass passage that can cause at least a portion of flowing oil to bypass one or more oil flow paths that would direct oil to ends of a through bore that can receive a bearing that rotatably supports a turbocharger shaft.

As an example, a turbocharger center housing can include a cooling core oil flow rate that is defined by an amount of oil that is deemed bearing oil flow and by an amount of oil that is deemed bearing oil bypass flow. In such an example, a diameter or diameters of an oil bypass passage (e.g., or passages) may define how much or what percentage of flowing oil is bearing oil flow and how much or what percentage of the flowing oil is bearing oil bypass flow. As an example, a diameter or other shape parameter of a passage and/or a regulation component may be selected based at least in part on an oil pump capacity, which may be a mechanical oil pump, an electric oil pump or a mechanical and electric oil pump.

The center housing 410 of FIG. 4 further differs from the center housing 280 of the turbocharger assembly 200 of FIG. 2 in that the oil flow to the center housing 280 is via a passage that is directly from an oil inlet to an opening of the through bore of the center housing 280. In the center housing 280, for a given oil flow rate, flowing oil has a low residence time between the oil inlet and the opening of the through bore. In contrast, in the center housing 410, for that given oil flow rate, the residence time of flowing oil is increased prior to reaching the opening 433 of the bore wall 431. In such an example, the increased residence time allows for heat transfer, for example, from exhaust heat soaked back to the center housing 410 from a turbine assembly to the flowing oil. Such an approach can help to cool the center housing 410 and, for example, allow a turbocharger to operate under various conditions without center housing water cooling features (e.g., tubing, passages, etc.). As an example, a turbocharger utilizing the center housing 410 as an oil only cooled center housing may operate suitably in scenarios where water cooled turbochargers are utilized. As an example, a housing can be an oil cooled housing that includes internal passages for flow of oil without including one or more passages for flow of water. In such an example, oil can be a lubricant and a heat transfer fluid. As a lubricant, it may form one or more lubricant films for lubrication of one or more rotating or rotatable components (e.g., a rotatable shaft, etc.).

Figure 11:
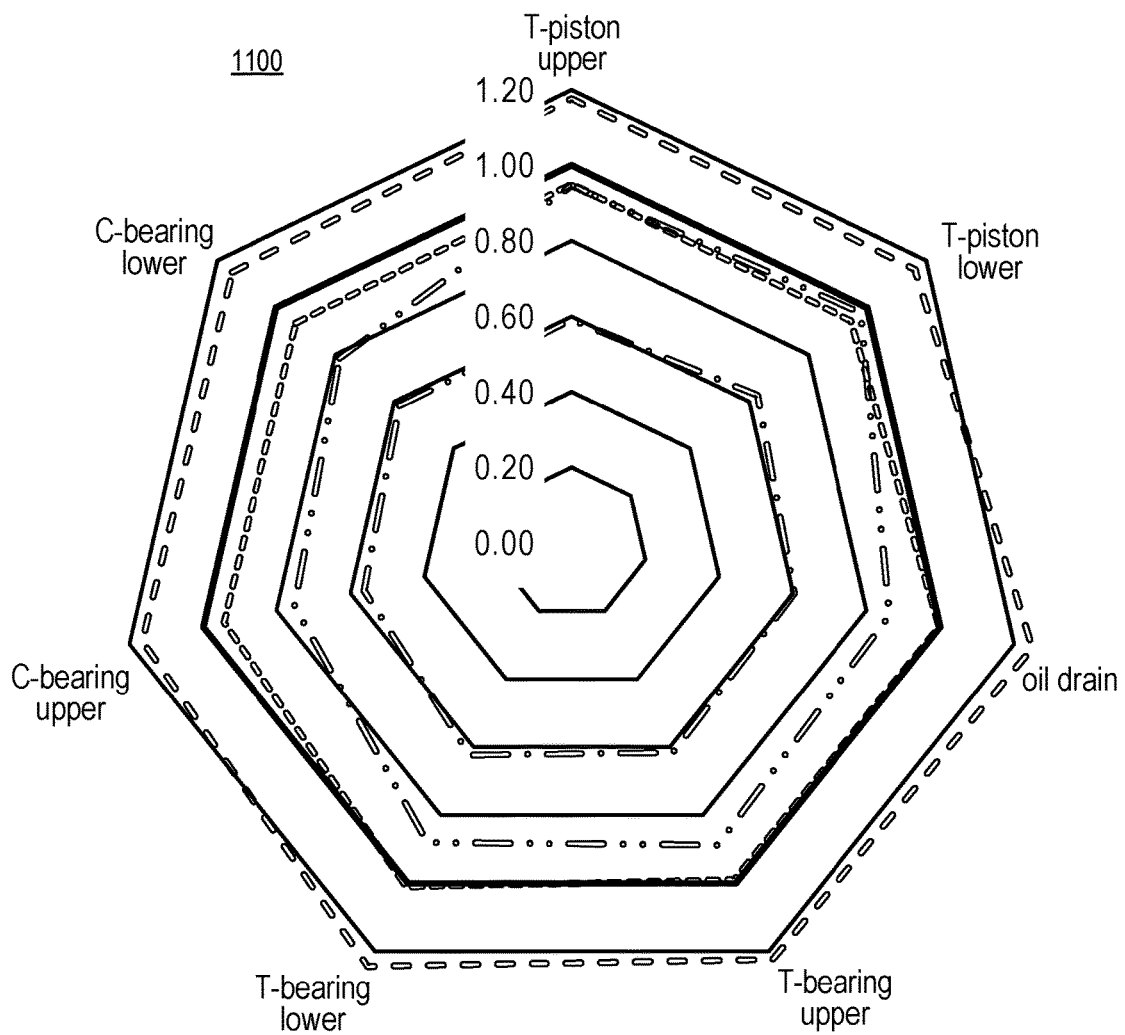
FIG. 11 is an example of a plot of temperatures at different locations of an oil cooled turbocharger assembly.

FIG. 11 shows an example of a radar plot 1100 of temperature with respect to locations in a turbocharger center housing such as the center housing 410 of FIG. 4 (see oil cooled) at 980 degrees C. and various other types of turbocharger center housings, which include an air cooled type at 800 degrees C., an air cooled type extrapolated to 980 degrees C., and a water cooled type at 980 degrees C. Additionally, prescribed limits (PS) are shown as a solid line.

As shown in FIG. 11, the oil cooled housing can maintain temperatures at various location within the prescribed limits. The highest temperatures, as normalized, are at the piston ring seating bore groove of the bore wall 427 of the housing 410 as shown in FIG. 7B where an annular groove is shown in the bore wall 427 adjacent to the recess 446. As shown in FIG. 7B, the recess 446 creates a gap between an opening of the bore wall 427 and an opening of the bore wall 431. As an example, a bore wall may be stepped (e.g., a stepped bore wall) and/or may be of increasing and/or decreasing radius (e.g., or diameter). As shown in FIG. 7B, the bore wall 431 has two smaller diameter portions and a larger diameter portion therebetween where chamfered annular surfaces form transitions between the portions. The bore wall 427 can include a smaller diameter portion and a flared diameter portion.

Figure 12:
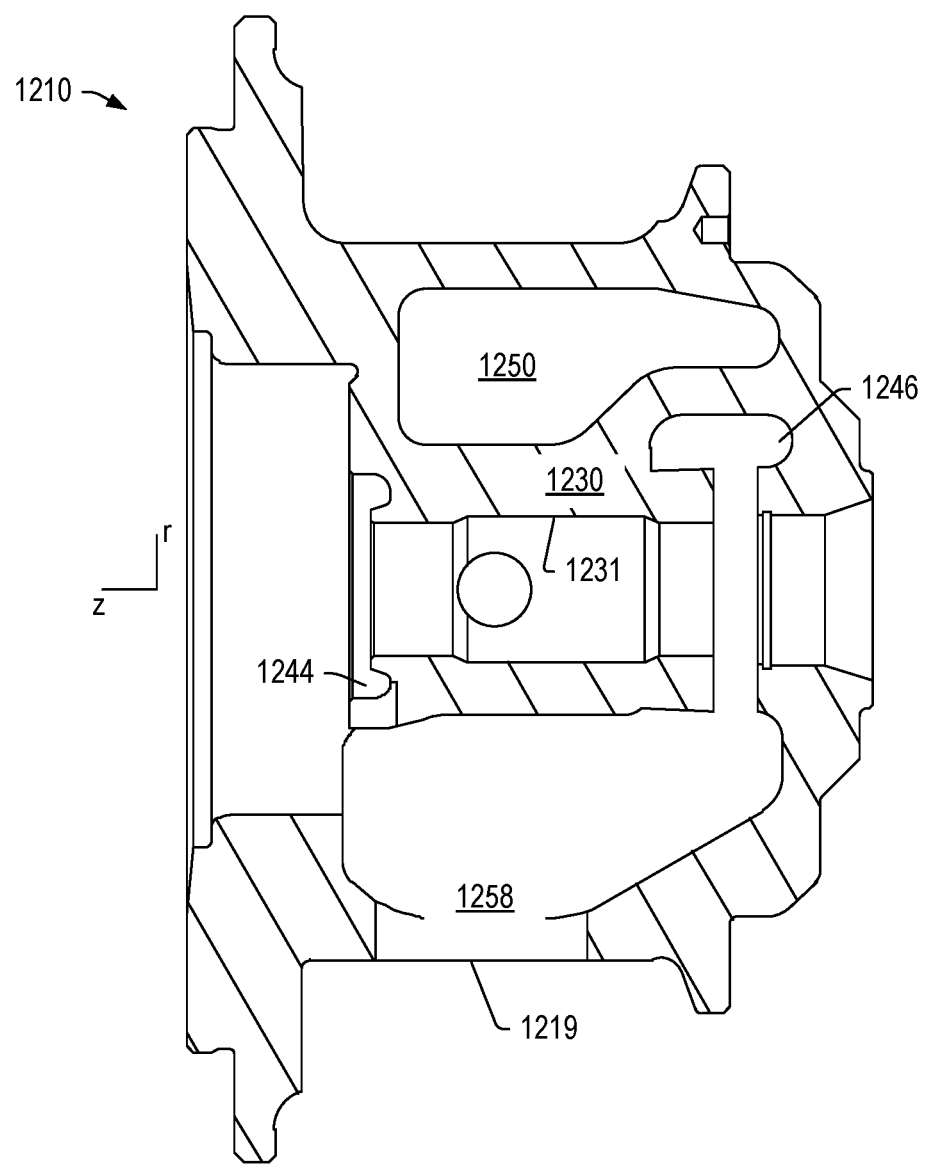
FIG. 12 is a cross-sectional view of an example of a housing.

FIG. 12 shows an example of a housing 1210 that does not include the opening 439 as shown in FIG. 4. As shown in FIG. 12, the housing includes an oil outlet 1219, a bearing boss 1230 with a bore wall 1231, an arcuate oil passage 1250 and an oil drainage cavity 1258. As shown, the bore wall 1231 does not include an oil passage that directly, fluidly connects to the oil drainage cavity 1258. In such an example, oil may flow to the oil drainage cavity 1258 via ends of the bore wall 1231, for example, via recesses 1244 and 1246.

Figure 13:
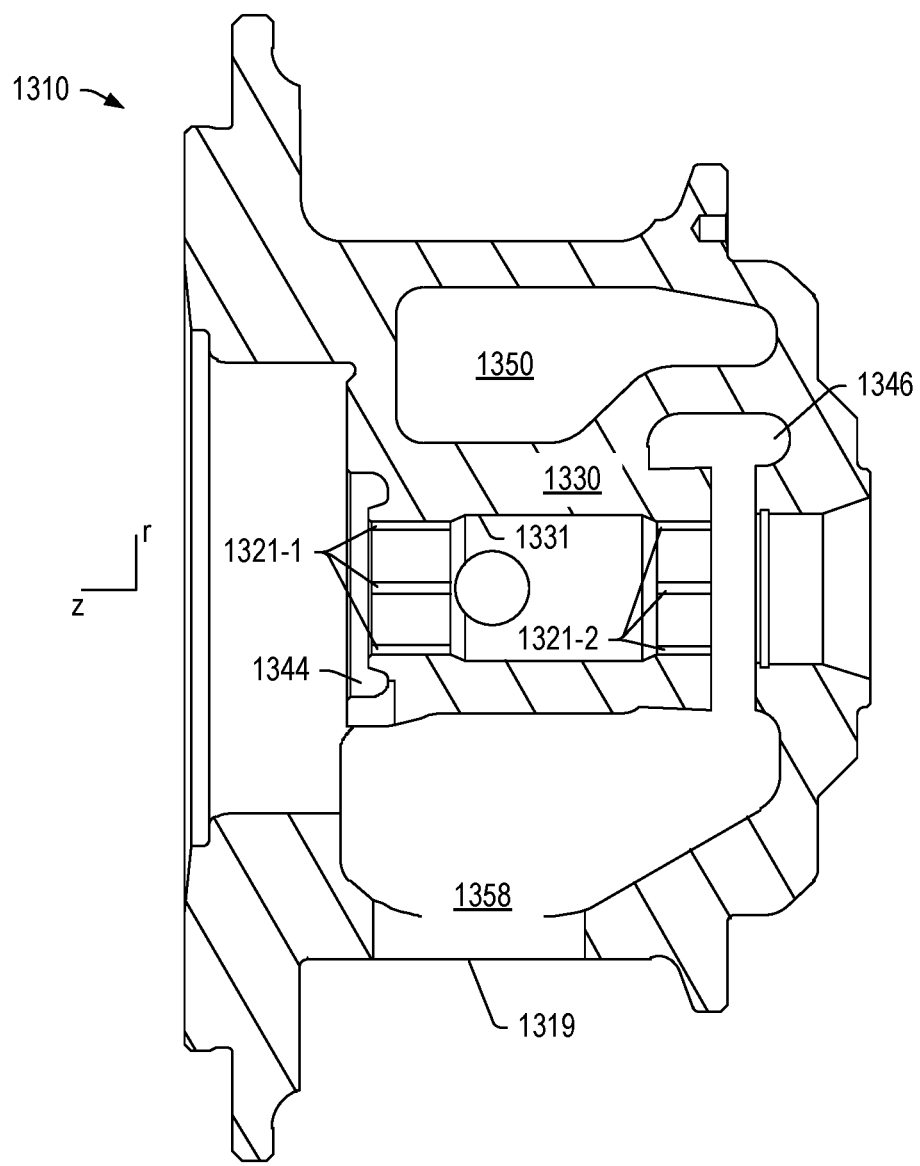
FIG. 13 is a cross-sectional view of an example of a housing.

FIG. 13 shows an example of a housing 1310 that does not include the opening 439 as shown in FIG. 4. As shown in FIG. 13, the housing includes an oil outlet 1319, a bearing boss 1330 with a bore wall 1331, an arcuate oil passage 1350 and an oil drainage cavity 1358. As shown, the bore wall 1331 does not include an oil passage that directly, fluidly connects to the oil drainage cavity 1358. In such an example, oil may flow to the oil drainage cavity 1358 via ends of the bore wall 1331, for example, via recesses 1344 and 1346. To facilitate such flow, the bore wall 1331 can include grooves 1321-1 and 1321-2. As shown, the grooves 1321-1 extend from a larger diameter portion of the bore wall 1331 toward the compressor side of the housing 1310 and the grooves 1322-2 extend from the larger diameter portion of the bore wall 1331 toward the turbine side of the housing 1310. The number and size of the grooves may be selected based on flow requirements, cooling requirements, etc. As an example, a groove may be a channel that extends axially with a depth and a width. Such a groove or channel may be defined with respect to a cylindrical coordinate system, for example, via coordinates r, z and Θ where z represents an axis that is a central axis of a bore of a housing that can receive one or more bearings (e.g., to rotatably support a shaft of a shaft and turbine wheel assembly).

Figure 14A:
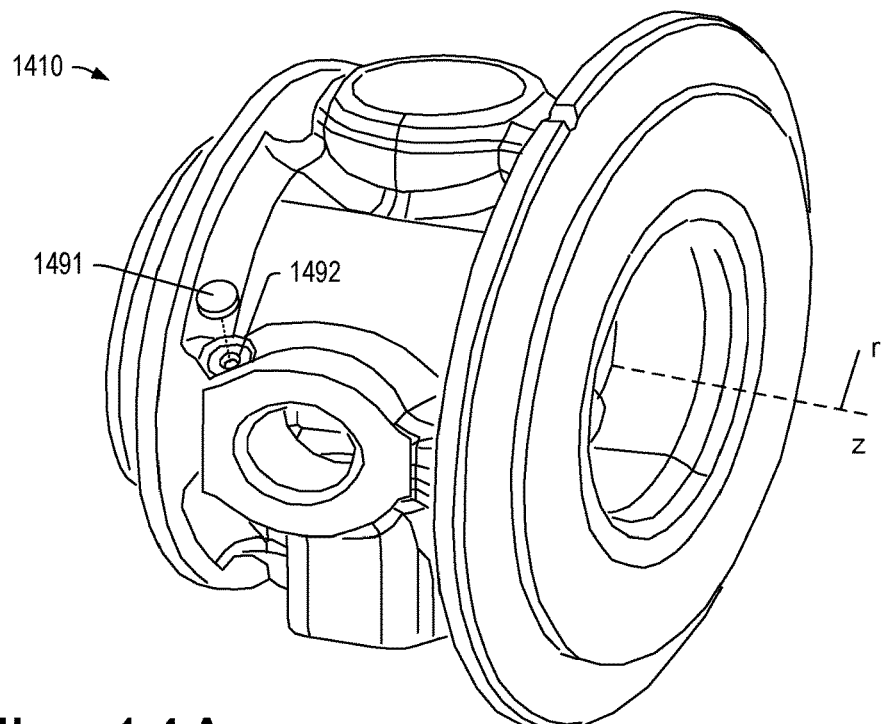
FIGS. 14A and 14B are a perspective view and a cross-sectional view of an example of a housing.
Figure 14B:
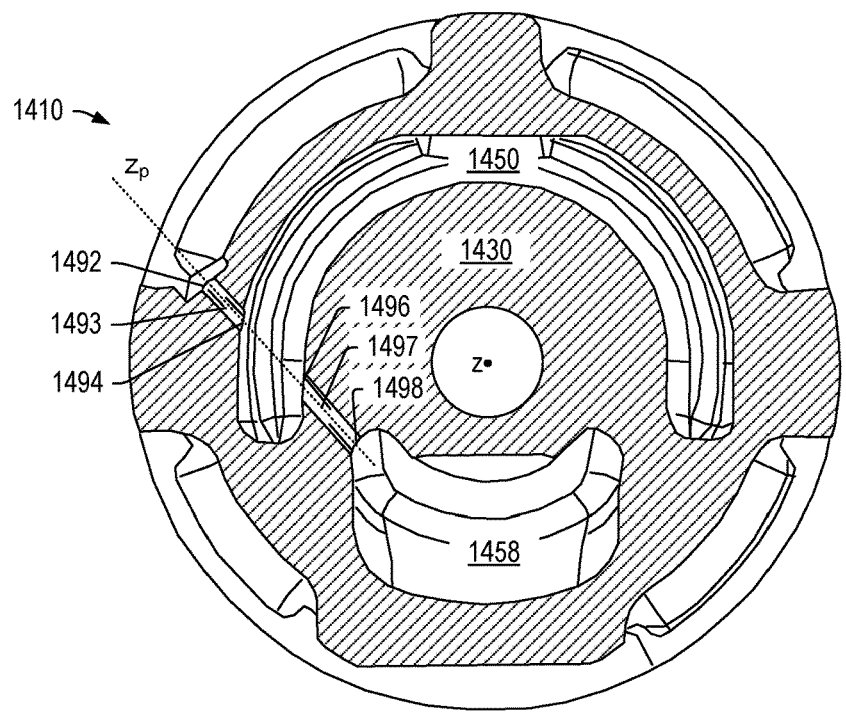

FIGS. 14A and 14B show a perspective view and a cross-sectional view of an example of a housing 1410 that includes a bearing boss 1430, an arcuate oil passage 1450, an oil drainage cavity 1458 and a bypass passage 1497, which includes an opening 1496 to the arcuate oil passage 1450 and an opening 1498 to the oil drainage cavity 1458.

As an example, the bypass passage 1497 may be formed by drilling a bore into the housing 1410. For example, from an exterior location, a drill may be used with a drill bit of a selected size and length to form the bypass passage 1497 via first drilling into the housing 1410 to form an opening 1492, a passage 1493 and an opening 1494. As an example, the passage 1493 may be sealed via a seal element 1491 that may seat into a recess at the opening 1492.

As an example, a temperature sensor and/or other type of sensor may be inserted into such a bore to a desired depth. For example, consider positioning a temperature sensor into the arcuate oil passage 1450 via the opening 1492 and the opening 1494. As an example, a flow sensor may be inserted to measure flow in the arcuate oil passage 1450. As an example, a sensor may be thin enough to form an annular region or other region such that oil may flow past the sensor and via the bypass passage 1497 to the oil drainage cavity 1458.

As an example, a bypass passage may be formed via the oil outlet of a housing. For example, a drill bit may be inserted via the oil inlet and used to drill a bypass passage from the oil drainage cavity into the arcuate oil passage of the housing.

As an example, an arcuate oil passage may commence on a bottom or a top of housing and be utilized to achieve a desired amount of heat rejection capability. As an example, an arcuate oil passage can be defined at least in part by an arc angle. For example, an arc angle may be an angle in a range from approximately 45 degrees to approximately 360 around a longitudinal axis of a bore of a bearing boss portion of a housing.

As an example, a turbocharger can include a center housing; a compressor assembly operatively coupled to the center housing; and a turbine assembly operatively coupled to the center housing, where the center housing includes a bearing boss that includes a bore wall with opposing axial ends that define an axial through bore having opposing axial openings, an oil inlet, an oil outlet, an arcuate oil passage in fluid communication with the oil inlet, an oil passage in fluid communication with the arcuate oil passage and an opening in the bore wall, and an oil drainage passage in fluid communication with the opposing axial openings of the through bore and in fluid communication with the oil outlet. As an example, an oil drainage passage can be an oil cavity, which may be, for example, oriented with an opening thereof having an axis substantially aligned with gravity when installed in a vehicle. For example, such an opening can be a drain of the oil cavity that can receive oil (e.g., as a lubricant and a heat transfer fluid) that can be circulated in a system of a vehicle, filtered (e.g., by one or more filters) and returned to the center housing (e.g., via a pump or pumps). As an example, a drain axis may be aligned at an angle of about 0 degrees to about plus or minus 25 degrees with respect to gravity.

As an example, a bearing boss of a housing can include a pin bore that can receive a pin such as, for example, a locating pin, which may be an anti-rotation pin that limits rotation of a bearing (e.g., or bearing system component) disposed at least in part in a bore of the bearing boss and/or that limits axial movement of such a bearing (e.g., or bearing system component).

As an example, a bearing boss can include an oil bypass passage that is in fluid communication with an opening of a bore wall of the bearing boss and in fluid communication with an oil drainage passage (e.g., an oil cavity for drainage of oil). In such an example, a component can be included that regulates oil flow from the oil bypass passage to the oil drainage passage.

As an example, a turbocharger can include an oil cooled center housing that does not include one or more water passages and corresponding water inlet and outlet openings.

As an example, a bearing boss can include a pin bore that includes a pin bore axis that, upon extension thereof, passes through an oil inlet.

As an example, a bearing boss can include an oil bypass passage that is in fluid communication with an opening of a bore wall of the bearing boss and in fluid communication with an oil drainage passage (e.g., an oil cavity as a drainage cavity that can collect oil from various regions within a housing), where the oil bypass passage includes a passage axis that, upon extension thereof, passes through the oil outlet.

As an example, a center housing of a turbocharger can include an arcuate oil passage that spans an arc angle of approximately 180 degrees about an axis of a through bore of the center housing that can receive a bearing or bearings to rotatably support a shaft of the turbocharger (e.g., a shaft of a turbine wheel and shaft assembly (SWA)). As an example, an arcuate oil passage may span an arc angle that can be in a range from approximately 130 degrees to approximately 360 degrees.

As an example, an arcuate oil passage can be defined in part by a first wall of a center housing that includes a first radius and a second wall of the center housing that includes a second, larger radius. In such an example, along a radial line that extends from a central axis of a through bore of the center housing, the difference between the first and second radii can define a dimension of the arcuate oil passage. As an example, such a dimension may vary or may be relatively constant with respect to an axial distance. As an example, an arcuate oil passage can have a volume that is defined by radii and axial dimensions (see, e.g., the example housing 410 of FIG. 8).

As an example, an arcuate oil passage of a center housing can have a maximum axial length that is approximately 50 percent to approximately 150 percent of an axial length of a through bore of a bearing boss of the center housing (see, e.g., the example housing 410 of FIG. 7A).

As an example, an arcuate oil passage of a center housing can include a substantially semi-annular cross-sectional shape. For example, such an arcuate oil passage can be approximately 180 degrees as to an azimuthal arc span about a central axis of a through bore of the center housing that receives one or more bearings to rotatably support a shaft (e.g., a shaft of a shaft and turbine wheel assembly (SWA)) and such an arcuate oil passage can be defined by walls where one wall may be an inner wall and another wall may be an outer wall where both walls are walls of a cast center housing (e.g., a cast metal or alloy center housing). As an example, an arcuate oil passage may be cast into a center housing during manufacture of the center housing. For example, a core may be disposed in a mold where the core is a positive volume (e.g., of suitable material such as compacted sand, etc., optionally with a binder, which may be polymeric, etc.) that can be removed after molten material introduced into the mold solidifies such that the core forms a negative volume within a center housing where such a negative volume corresponds to an arcuate oil passage.

As an example, a center housing may be oriented with respect to gravity according to a predetermined orientation or range of orientations. In such an example, a range of orientations may be from about plus 25 degrees to about minus 25 degrees as to an axis of an oil outlet (e.g., a drain or drain opening) and the direction of the acceleration of gravity.

As an example, an arcuate oil passage of a center housing can have an arc angle that is greater than approximately 45 degrees about an axis of the axial through bore and/or that is less than or equal to approximately 360 degrees about an axis of the axial through bore.

As an example, a center housing can include a bypass passage that includes an opening that is in fluid communication with an arcuate oil passage of the center housing and an opening that is in fluid communication with an oil drainage passage (e.g., an oil cavity that can collect oil and direct collected oil to a drain as an oil outlet).

As an example, a center housing can include a bore wall of a through bore that can receive one or more bearings. As an example, a bearing may be a journal bearing. As an example, a bore wall can include one or more grooves. As an example, a groove may be an axial groove or a groove may be curved along a bore wall.

As an example, a method can include, in a center housing that includes a bearing boss that includes a bore wall with opposing axial ends that define an axial through bore having opposing axial openings, an oil inlet, an oil outlet, an arcuate oil passage in fluid communication with the oil inlet, an oil passage in fluid communication with the arcuate oil passage and an opening in the bore wall, and an oil drainage passage in fluid communication with the opposing axial openings of the through bore and in fluid communication with the oil outlet, flowing oil to the oil inlet; receiving at least a portion of the flowing oil in the oil drainage passage from the opposing axial openings of the axial through bore; and flowing oil from the oil drainage passage to the oil outlet. In such an example, the method can include receiving another portion of the flowing oil in the oil drainage passage via an oil bypass passage disposed in the bearing boss. As an example, a method can include flowing oil to a center housing of a turbocharger without flowing water to the center housing of the turbocharger.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger comprising:
   an oil cooled center housing;
   a compressor assembly operatively coupled to the oil cooled center housing; and
   a turbine assembly operatively coupled to the oil cooled center housing,
   wherein the oil cooled center housing comprises
      a bearing boss that comprises a bore wall with opposing axial ends that define an axial through bore having a through bore axis and opposing axial openings wherein the opposing axial ends define an axial length of the axial through bore,
      an oil inlet,
      an oil outlet,
      an arcuate oil passage in fluid communication with the oil inlet wherein the arcuate oil passage comprises a maximum axial length that, measured parallel to the through bore axis, is 50 percent to 150 percent of the axial length of the axial through bore,
      an oil passage in fluid communication with the arcuate oil passage and an opening in the bore wall, and an oil drainage passage in fluid communication with the opposing axial openings of the axial through bore and in fluid communication with the oil outlet.

2. The turbocharger of claim 1 wherein the bearing boss comprises a pin bore.

3. The turbocharger of claim 1 wherein the bearing boss comprises an oil bypass passage that is in fluid communication with an opening-of the bore wall and in fluid communication with the oil drainage passage.

4. The turbocharger of claim 3 comprising an orifice that regulates oil flow from the oil bypass passage to the oil drainage passage, wherein the orifice provides a desired amount of resistance to the oil flow.

5. The turbocharger of claim 1 wherein the bearing boss comprises a pin bore that comprises a pin bore axis that, upon extension thereof, passes through the oil inlet.

6. The turbocharger of claim 1 wherein the bearing boss comprises an oil bypass passage that is in fluid communication with an opening of the bore wall and in fluid communication with the oil drainage passage, wherein the oil bypass passage comprises a passage axis that, upon extension thereof, passes through the oil outlet.

7. The turbocharger of claim 1 wherein the arcuate oil passage- spans an arc angle of 180 degrees about the axis of the axial through bore.

8. The turbocharger of claim 1 wherein the arcuate oil passage-is defined in part by a first wall of the oil cooled center housing that comprises a first radius and a second wall of the center housing that comprises a second, larger radius.

9. The turbocharger of claim 1 wherein the arcuate oil passage comprises a semi-annular cross-sectional shape.

10. The turbocharger of claim 1 wherein the oil cooled center housing is oriented with respect to gravity according to a predetermined orientation or range of orientations.

11. The turbocharger of claim 10 wherein the range of orientations comprises plus 25 degrees to minus 25 degrees as to an axis of the oil outlet and the direction of the acceleration of gravity.

12. The turbocharger of claim 1 wherein the arcuate oil passage comprises an arc angle that is greater than 45 degrees about an axis of the axial through bore.

13. The turbocharger of claim 1 wherein the arcuate oil passage comprises an arc angle that is less than or equal to 360 degrees about an axis of the axial through bore.

14. The turbocharger of claim 1 comprising a bypass passage that comprises an opening in fluid communication with the arcuate oil passage and an opening in fluid communication with the oil drainage passage.

15. The turbocharger of claim 1 wherein the bore wall comprises grooves.

16. The turbocharger of claim 1, wherein the oil cooled center housing does not include one or more water passages and corresponding water inlet and outlet openings.

17. A method comprising:
in a center housing that comprises a bearing boss that comprises a bore wall with opposing axial ends that define an axial through bore having opposing axial openings, an oil inlet, an oil outlet, an arcuate oil passage in fluid communication with the oil inlet, an oil passage in fluid communication with the arcuate oil passage and an opening in the bore wall, and an oil drainage passage in fluid communication with the opposing axial openings of the axial through bore and in fluid communication with the oil outlet, flowing oil to the oil inlet;
receiving at least a portion of the flowing oil in the oil drainage passage from the opposing axial openings of the axial through bore;
receiving another portion of the flowing oil in the oil drainage passage via an oil bypass passage disposed in the bearing boss; and
flowing oil from the oil drainage passage to the oil outlet.

18. A turbocharger comprising:
a center housing;
a compressor assembly operatively coupled to the center housing; and
a turbine assembly operatively coupled to the center housing,
wherein the center housing comprises
a bearing boss that comprises a bore wall with opposing axial ends that define an axial through bore having opposing axial openings,
an oil inlet,
an oil outlet,
an arcuate oil passage in fluid communication with the oil inlet,
an oil passage in fluid communication with the arcuate oil passage and an opening in the bore wall, and
an oil drainage passage in fluid communication with the opposing axial openings of the axial through bore and in fluid communication with the oil outlet, and
wherein the bearing boss comprises an oil bypass passage that is in fluid communication with an opening of the bore wall and in fluid communication with the oil drainage passage.

19. A turbocharger comprising:
a center housing;
a compressor assembly operatively coupled to the center housing; and
a turbine assembly operatively coupled to the center housing,
wherein the center housing comprises
a bearing boss that comprises a bore wall with opposing axial ends that define an axial through bore having opposing axial openings,
an oil inlet,
an oil outlet,
an arcuate oil passage in fluid communication with the oil inlet,
an oil passage in fluid communication with the arcuate oil passage and an opening in the bore wall, and
an oil drainage passage in fluid communication with the opposing axial openings of the axial through bore and in fluid communication with the oil outlet, and
wherein the bearing boss comprises a pin bore that comprises a pin bore axis that, upon extension thereof, passes through the oil inlet.

\* \* \* \* \*